United States Patent

Ahuja et al.

Patent Number: 6,041,307
Date of Patent: Mar. 21, 2000

[54] TECHNIQUE FOR EFFECTIVELY MANAGING RESOURCES IN A NETWORK

[75] Inventors: Sudhir R. Ahuja, Aberdeen, N.J.; Ioannis A. Korilis, New York, N.Y.; Theodora A. Varvarigou, Athens, Greece

[73] Assignee: Lucent Technologies Inc., Murray Hill, N.J.

[21] Appl. No.: 09/012,866

[22] Filed: Jan. 23, 1998

[51] Int. Cl.[7] .................................................. B43K 29/00
[52] U.S. Cl. ................................. 705/8; 705/20; 705/26; 705/27
[58] Field of Search .................................. 705/8, 20, 26, 705/27

[56] References Cited

U.S. PATENT DOCUMENTS 5,826,244  10/1998  Huberman ................................ 705/37

Primary Examiner—Thomas R. Peeso

[57] ABSTRACT

In an intranet, servers provide services for a price. A user is allotted a budget consisting of a limited amount of electronic credits to pay for the services. When the user requests a selected service from a server, the server offers a service price which can be accepted or rejected by the user, depending on the importance of the service to the user. The service price is determined based on, for example, the workload attendant to the requested service, its quality of service (QOS) requirements and current conditions pertaining to the server, in accordance with a pricing strategy. The latter is implemented to achieve network-wide objectives such as reducing network congestion by balancing load among the servers.

40 Claims, 2 Drawing Sheets

100

TECHNIQUE FOR EFFECTIVELY MANAGING RESOURCES IN A NETWORK

FIELD OF THE INVENTION

The invention relates to techniques for management of a network, and more particularly to a technique for managing limited resources in such a network as an intranet.

BACKGROUND OF THE INVENTION

Recently, intranets were developed to handle internal communications and computing needs in a corporate or an institutional environment. An intranet is realized based upon open network technologies developed for the Internet. For example, like the Internet, an intranet employs the same transmission control protocol/Internet protocol (TCP/IP) to transport information through the network.

A prior art intranet includes different servers and allows users to request services from the servers to realize internal communications, real-time applications, collaborations, etc. Mirroring the service provision approach of the Internet, the intranet provides the requested services on a first-come first-served basis, regardless of the workload attendant thereto. However, the resources in the intranet, e.g., memory storage space, server CPU times, transmission bandwidth, etc. are limited. As a result, the intranet, when congested, oftentimes meets a new service request with an unacceptable quality of service (QOS), and may even deny the request regardless of its importance to the user. Consequently, the use of such an intranet proves to be counter-productive, often causing frustration to the users.

Accordingly, there exists a need for efficient management of intranet resources to balance the network load and thereby reduce the congestion, to provide the users with an acceptable QOS, and to allow access to the network resources on a priority basis. The same need also applies to the Internet.

SUMMARY OF THE INVENTION

We have recognized that the inefficient resource management of an Internet-type network, such as the prior art intranet described above, is attributable to the ingrained service philosophy of the Internet which the Internet-type network inherits. This service philosophy advocates the ideology of "free service access for all," and is born out of the fact that the Internet, which is an international network of networks, is realized by cooperative efforts of a vast number of individual entities providing the network resources. That is, the Internet resources are not owned by any single entity. As a result, no entity is in charge of overall Internet resource management, and its implementation, if any, would be at odds with the aforementioned service philosophy anyway.

However, in a significant departure from the Internet service philosophy, the invention calls for rationing services provided in a network by price to effectively manage the resources in the network. In accordance with the invention, each service in the network is provided for a price, which varies, pursuant to a pricing strategy, with one or more factors related to the service or the current providing of it, e.g., the availability of one or more resources in the network, the workload attendant to the service, its QOS requirements, the current conditions pertaining to a server in the network rendering the service, etc. In an illustrative embodiment, after a user at a terminal requests a selected service from a server in the network, the server provides to the terminal information on the price of the service. The terminal then responds, based on preset criteria or a user input, as to whether to continue with the service in view of the price. In addition, the terminal or user thereof has a budget consisting of a limited amount of credits, whose value may be stored in the terminal or network. The service price is represented by a second amount of credits, which are applied against the budget when the terminal elects to continue with the service.

In accordance with an aspect of the invention, the aforementioned pricing strategy is implemented to achieve network-wide objectives such as reducing network congestion by balancing load among servers. In accordance with another aspect of the invention, multiple prices for a service may be transmitted to the terminal for selection, which reflect different QOS requirements of the same service.

Thus, with the invention, among other things, the priority of a user's request for a service is based upon the amount of credits that the user is willing to spend on that service.

BRIEF DESCRIPTION OF THE DRAWING

In the drawing.

Throughout this disclosure, unless stated otherwise, like elements, components and sections in the figures are denoted by the same numerals.

DETAILED DESCRIPTION

Figure 1:
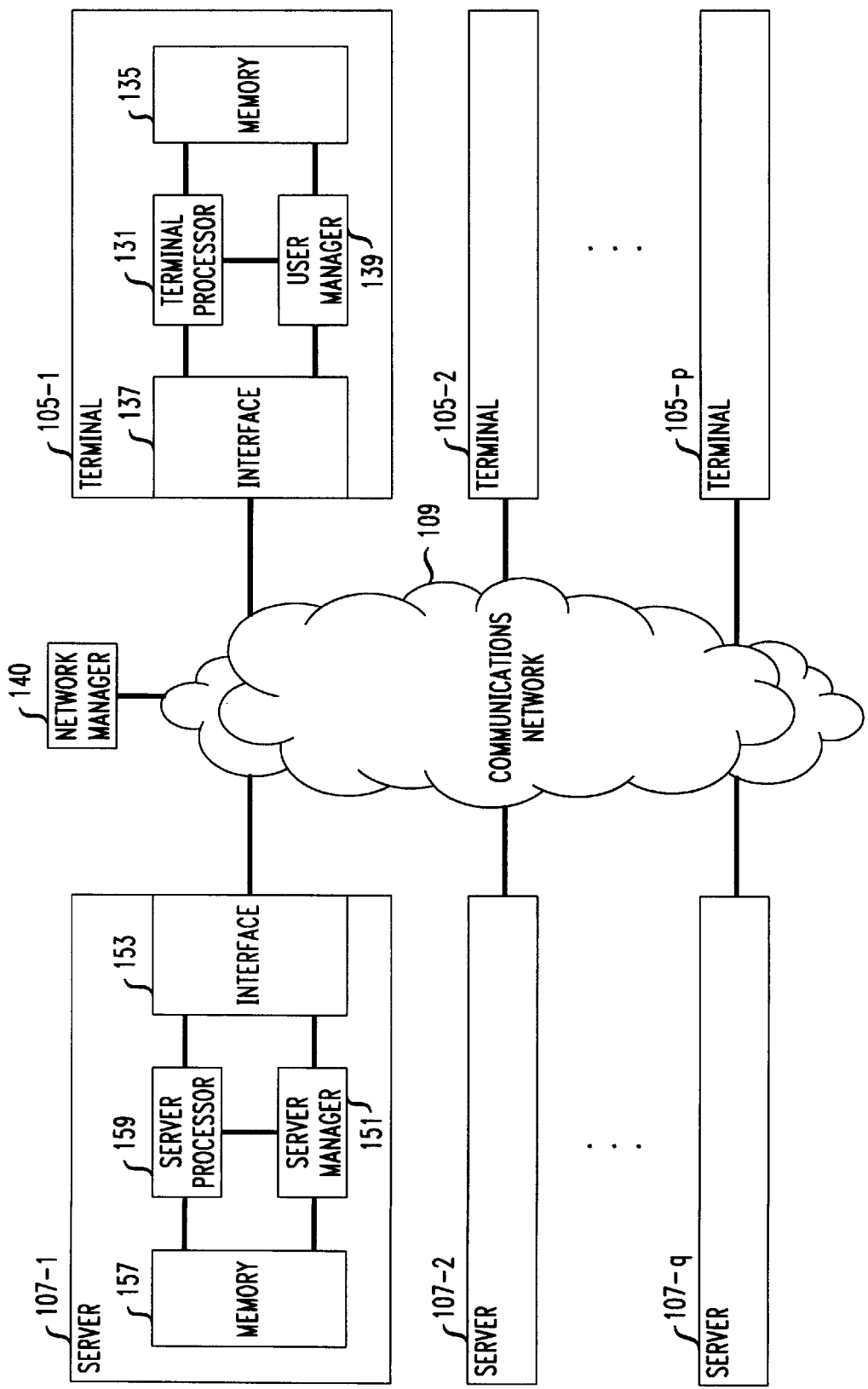
FIG. 1 illustrates an intranet in accordance with the invention.

FIG. 1 illustrates intranet 100 embodying the principles of the invention, which is used in a corporate environment for instance. In intranet 100, users may utilize terminals 105-1 through 105-$p$ to request, via communications network 109, servers 107-1 through 107-$q$ to provide such services as data transfer, real-time applications and collaborations, where p and q are integers greater than zero. Communications network 109 in this instance is a conventional IP network, and supports communications in intranet 100 which are in the form of information packets pursuant to the standard TCP/IP format.

Typically, an intranet having limited resources in, for example, memory storage space, server CPU times, transmission bandwidth, etc., allows access to such resources on a first-come first-served basis. As a result, such an intranet, when congested, oftentimes meets a new service request with unacceptable QOS, or may even deny the request regardless of its importance to the user. We have recognized that a lack of effective management of the resources in the traditional intranet is the major contributing factor of its inefficiency.

In accordance with the invention, each user of intranet 100 is allotted a budget consisting of a limited amount of "electronic credits." The user obtains each service furnished by intranet 100 for a price, i.e., a debit against the electronic credits. The user's budget depends on the funding of the specific project on which he/she is working in the organization, and reflects the overall priority of the project requiring the services. Once all the electronic credits are exhausted, the user is no longer able to access any service that has a non-zero price.

Without loss of generality, a user utilizes terminal 105-1 to access a service, say, data transfer, by server 107-1 in a certain project. In accordance with the invention, at the beginning of each budget period, network manager 140 provides to terminal 105-1 information concerning the budget allocated to the project. The budget consists of a predetermined amount of electronic credits which the user can spend on the various services furnished by intranet 100 during that period. This information is stored in memory 135.

In requesting the data transfer, terminal processor 131 generates a service request destined for server 107-1, which includes a QOS requirement. The latter may specify a delay tolerance level in this instance. In a well known manner, the service request is packetized into multiple packets pursuant to the TCP/IP format. The service request packets are then transmitted to communications network 109 through interface 137. Based on a destination address indicated in the packets, communications network 109 routes such packets to server 107-1. The service request packets are received by server manager 151 through interface 153.

Figure 2:
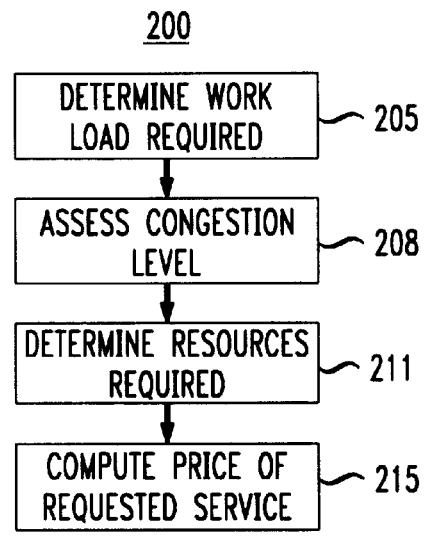
FIG. 2 is a flow chart depicting a process for pricing a service provided in the intranet of FIG. 1.

After depacketizing the service request packets, manager 151 runs routine 200 in FIG. 2 to determine the current price of the requested service. Instructed by such a routine stored in memory 157, manager 151 determines the workload attendant to the requested service which is required of server processor 159, as indicated at step 205. It should be noted that such a workload is objectively measured, independent of the load currently sustained by processor 159. For example, one of the objective load measures would be the amount of CPU time which needs to be consumed to realize the requested service. In this instance, the workload is measured by the amount of data needs to be transferred to terminal 105-1.

To facilitate the determination of the workload associated with each service request extendable to processor 159, manager 151 maintains a database in memory 157. This database comprises a look-up table containing workload measures associated with likely service requests. For those requests which are not listed in the table, manager 151 sends the workload inquiries to processor 159 to elicit the corresponding workload measures. The database is periodically updated to reflect new service request additions, and changes in workload measures associated with existing service requests.

At step 208, manager 151 assesses a congestion level, i.e., the availability of necessary resources, at server 107-1 at the time of the request. Manager 151 further determines at step 211 the amount of resources such as transmission bandwidth needed to satisfy the required QOS. At step 215, manager 151 computes the price of the requested service using an algorithm which is a function of the workload measure, congestion level, the required resources determined above, etc. It is apparent that since the congestion level of server 107-1 varies with time, the price of the requested service is a function of time.

The aforementioned algorithm used by manager 151 reflects a pricing strategy designed to operate intranet 100 to meet certain network-wide objectives directed to, for example, load balancing among servers providing similar services, and avoidance of network congestion and overload. As the pricing strategy changes from time to time to maintain those network-wide objectives, the algorithm in question changes accordingly. It should be noted that although this algorithm is also a function of time, it varies at a rate lower than that of a service price change in a server in response to the fluctuation of the server's local conditions.

Specifically, network manager 140 controls the pricing strategy, and from time to time collects from the service manager of each of servers 107-1 through 107-*q* information concerning the current status, load and performance of the corresponding server. Based on the collected information, manager 140 determines the appropriate pricing strategy at that time and the algorithm reflecting such a strategy. This algorithm is communicated to server managers which then use it to price the services in the corresponding servers.

Continuing the above example, after determining the price of the requested service, service manager 151 sends a service offer directed to user manager 139 through communications network 109, reporting at least the price of the requested service with the specified QOS. It will be appreciated that the service offer may include information not only on such a price, but also prices of the requested service with varying QOS's.

User manager 139 processes the received offer, and decides whether to accept or reject same based on predetermined criteria. Alternatively, the offer may be communicated to the user by displaying the offer on terminal 105-1 especially where other prices for varying QOS's are also provided. The user would then make the decision based on the received offer.

The predetermined criteria used by manager 139 may be based on pre-selected price ranges for different services, reflecting their priorities to the user. That is, only if the offered price is within the pre-selected price range of the requested service, would manager 139 decide to accept the offer. Alternatively, the criteria may be designed to optimize both performance and cost objectives pre-defined by the user.

If user manager 139 decides to accept the offer, it causes the current amount of electronic credits stored in memory 135 to be reduced by the service price. Manager 139 then generates an acceptance message, and transmits same to server manager 151. In response to the acceptance message, manager 151 forwards the original service request to server processor 159 for further processing. Accordingly, processor 159 delivers the requested service directly to terminal processor 131, bypassing manager 151 and manager 139. Otherwise, if manager 139 decides to reject the offer, it provides a reject message to server manager 151, which would then cancel the outstanding service request.

It is noteworthy that in intranet 100 in accordance with the invention, the priority of a user's request for a selected service is based upon the amount of electronic credits that the user is willing to spend on that service. That is, the priority is determined on a request by request basis according to the user's preferences and needs. A user who has a relatively low budget but is willing to pay more than a user having a relatively high budget for a particular service attains the priority for that service, despite the disparity in their overall budgets.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

Figure 3:
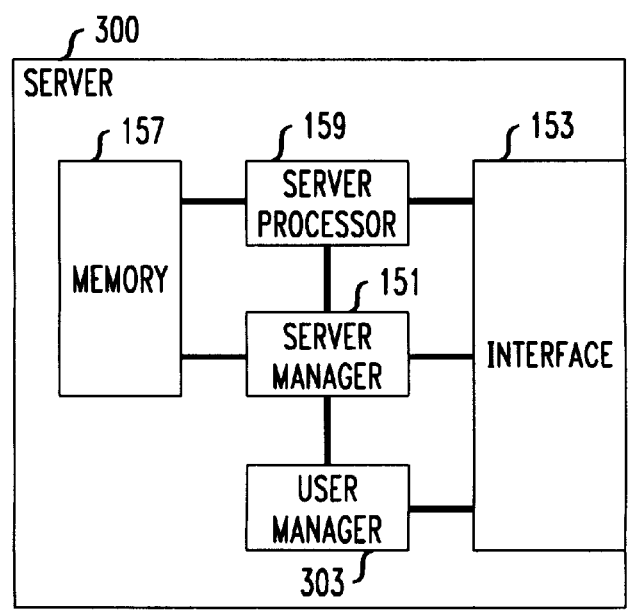
FIG. 3 is a block diagram of a server providing a composite service in the intranet of FIG. 1.

For example, in the illustrative embodiment, the service requested by terminal 105-1 requires only the service of server 107-1. However, in the event that the requested service is a composite service involving one or more servers in addition to server 107-1, the latter needs to negotiate with the additional servers for their respective sub-services to achieve the requested service. For instance, in a case where server 107-1 requires a sub-service of server 107-2 to deliver a composite service to terminal 105-1, the sub-service needs be provided to server 107-1 before it can deliver the composite service. In that case, server 107-1 acts not only as a service provider but also as a user with respect to server 107-2. In accordance with an aspect of the invention, in providing the composite service, server 107-1 takes the form of server 300 in FIG. 3. Compared with server 107-1 in FIG. 1, server 300 additionally includes user manager 303 to realize the user aspect thereof. User manager 303 performs functions similar to those of user manager 139, and interacts with the service manager of server 107-2 to obtain the price of the sub-service. The interactions between user manager 303 and the service manager are similar to those between user manager 139 and server manager 151 previously described. Service manager 151 here incorporates the sub-service price into the price of the composite service offered to user manager 139.

In addition, it will be appreciated that the invention will apply to networks or systems other than an intranet. Such other networks or systems include, for example, the Internet or a part thereof.

Finally, intranet 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. Apparatus for receiving a service from a predetermined server connected to a network, the apparatus comprising:

a processor for issuing a request for the service to the predetermined server through the network;

an interface for receiving, from the network, information on a price to be paid for the service, the price varying with at least availability of at least one resource in the predetermined server, said price being received in response to an issued request; and a controller for electing to receive the service based on a determination involving the price.

2. The apparatus of claim 1 wherein the price is a function of time.

3. The apparatus of claim 1 wherein the price also varies with a quality of service (QOS) requirement of the service.

4. The apparatus of claim 1 wherein the price also varies with a load in the network.

5. The apparatus of claim 1 further comprising a memory for storing a predetermined amount of credits, wherein the price is represented by a second amount of credits, the second amount of credits being applied against the predetermined amount of credits when the controller determines to receive the service.

6. The apparatus of claim 5 wherein the determination is at least based on whether the second amount of credits is not greater than the predetermined amount of credits.

7. The apparatus of claim 5 wherein the determination is at least based on whether the second amount of credits is within a predetermined range of credits.

8. The apparatus of claim 1 wherein the controller is responsive to a user input.

9. The apparatus of claim 1 wherein the processor includes the controller and the interface.

10. Software including machine readable instructions stored in a tangible medium for performing a process for receiving a service from a predetermined server connected to a network, the process comprising:

forming a request for the service to the predetermined server through the network;

receiving, from the network, information on a price to be paid for the service, the price varying with at least availability of at least one resource in the predetermined server, said price being received in response to an issued request; and determining whether to receive the service based on the price.

11. Apparatus for providing a service through a network comprising:

an interface for receiving a request for the service;

a processor responsive to the request for computing a price to be paid for the service, the price being based on at least availability of one or more resources in the apparatus to provide the service, the interface receiving from the network pricing strategy information for affecting a computation of the price; and a controller for determining whether the price is accepted before the service is provided.

12. The apparatus of claim 11 wherein the service is a composite service requiring a sub-service from a server, the apparatus further comprising means for receiving a second price to be paid for the sub-service, the computed price being a function of the second price.

13. Apparatus for providing a service comprising:

an interface for receiving a request for the service;

a processor responsive to the request for computing a price to be paid for the service, the price being based on at least availability of one or more resources in the apparatus to provide the service, the availability of one or more resources in the apparatus varies with time; and a controller for determining whether the price is accepted before the service is provided.

14. The apparatus of claim 11 wherein the price is also based on a workload required of the apparatus to provide the service.

15. The apparatus of claim 11 wherein the request specifies one or more QOS requirements of the service, and the price is also based on the QOS requirements.

16. The apparatus of claim 15 wherein one of the QOS requirements concerns a delay in providing the service.

17. The apparatus of claim 11 wherein the processor includes the controller and the interface.

18. A system for providing a service comprising:

first means for computing a price to be paid for the service;

second means for receiving the service, the price being applied against a predetermined budget allocated to the second means; and third means for controlling the first means to affect a computation of the price to manage one or more resources in the system.

19. The system of claim 18 includes an intranet.

20. The system of claim 18 includes at least part of the Internet.

21. The system of claim 18 wherein the third means includes means for providing the first means with a methodology for computing the price.

22. The system of claim 18 further comprising a server for delivering the service, the price being based on at least a current condition of the server.

23. The system of claim 22 wherein the third means includes means for obtaining information concerning the current condition of the server.

24. A method for use in an apparatus for receiving a service from a predetermined server connected to a network including one or more resources, the method comprising:

forming a request for the service to the predetermined server;

receiving, from the network, information on a price to be paid for the service, the price varying with at least availability of at least one of the resources in the predetermined server, said price being received in response to an issued request; and determining whether to receive the service based on the price.

25. The method of claim 24 wherein the price is a function of time.

26. The method of claim 24 wherein the price also varies with a QOS requirement of the service.

27. The method of claim 24 wherein the price also varies with a load in the network.

28. The method of claim 24 further comprising storing a predetermined amount of credits, wherein the price is represented by a second amount of credits, the second amount of credits being applied against the predetermined amount of credits when it is determined to receive the service.

29. The method of claim 28 wherein a determination to receive the service is made at least based on whether the second amount of credits is not greater than the predetermined amount of credits.

30. The method of claim 28 wherein a determination to receive the service is made at least based on whether the second amount of credits is within a predetermined range of credits.

31. A method for use in an apparatus for providing a service through a network, the method comprising:

receiving a request for the service;

computing, in response to the request, a price to be paid for the service, the price being based on at least availability of one or more resources in the apparatus to provide the service;

receiving from the network pricing strategy information for affecting a computation of the price; and determining whether the price is accepted before the service is provided.

32. The method of claim 31 wherein the service is a composite service requiring a sub-service from a server, the method further comprising receiving a second price to be paid for the sub-service, the computed price being a function of the second price.

33. The method of claim 31 wherein the availability of one or more resources in the apparatus varies with time.

34. The method of claim 31 wherein the price is also based on a workload required of the apparatus to provide the service.

35. The method of claim 31 wherein the request specifies one or more QOS requirements of the service, and the price is also based on the QOS requirements.

36. The method of claim 35 wherein one of the QOS requirements concerns a delay in providing the service.

37. A method for use in a system for providing a service comprising the steps of:

computing a price to be paid for the service;

receiving the service, the price being applied against a predetermined budget; and controlling the computing step to affect a computation of the price to manage one or more resources in the system.

38. The method of claim 37 wherein the controlling step includes the step of providing the computing step with a methodology for computing the price.

39. The method of claim 37 wherein the system includes a server for delivering the service, the price being based on at least a current condition of the server.

40. The method of claim 39 wherein the controlling step includes the step of obtaining information concerning the current condition of the server.

* * * * *